United States Patent [19]

Hogan, Sr. et al.

[11] 3,868,284

[45] Feb. 25, 1975

[54] TIRE RETREADING APPARATUS AND METHOD

[76] Inventors: Bernard E. Hogan, Sr.; John P. Hogan, both of 358 Carol Ct., Mankato, Minn. 56001

[22] Filed: Oct. 9, 1973

[21] Appl. No.: 404,192

[52] U.S. Cl............. 156/96, 156/128, 156/394 FM
[51] Int. Cl............................ B29h 5/04, B29h 5/16
[58] Field of Search...... 156/96, 110, 123, 126–129, 156/394, 394 FM

[56] References Cited
UNITED STATES PATENTS

| | | | |
|---|---|---|---|
| 2,014,010 | 9/1935 | Wheatley | 156/394 FM |
| 2,110,293 | 3/1938 | Fisher | 156/96 |
| 2,282,580 | 5/1942 | Hawkinson | 156/96 |
| 2,700,795 | 2/1955 | Kraft | 156/394 FM |
| 2,774,409 | 12/1956 | Skidmore | 156/96 |
| 3,698,975 | 10/1972 | Hogan | 156/96 |
| 3,809,592 | 5/1974 | Dennis | 156/96 |

FOREIGN PATENTS OR APPLICATIONS

| | | | |
|---|---|---|---|
| 1,026,724 | 4/1966 | Great Britain | 156/394 FM |
| 1,109,526 | 1/1956 | France | 156/394 FM |
| 209,731 | 12/1924 | Great Britain | 156/96 |
| 555,680 | 9/1943 | Great Britain | 156/394 FM |
| 450,885 | 8/1948 | Canada | 156/96 |

*Primary Examiner*—Clifton B. Cosby
*Assistant Examiner*—John E. Kittle
*Attorney, Agent, or Firm*—Schroeder Siegfried Ryan & Vidas

[57] ABSTRACT

An apparatus and method for recapping of worn tires with a precured tread is disclosed wherein the sidewalls of the tire carcass remain relatively cool during the bonding of a precured tread to the tire carcass. The heat required for bonding is applied entirely through the precured tread. A mold designed to introduce direct fluid pressure onto the outer surface of the precured tread provides both pressure for the bonding operation and acts to provide a portion of the heat transfer.

8 Claims, 4 Drawing Figures

3,868,284

TIRE RETREADING APPARATUS AND METHOD

The present invention is directed to the art of recapping of worn tires and is more particularly directed to the art of recapping of worn tires using a precured tire tread.

It is known in the art that one can produce superior recapped tires through the use of a tread which has been precured in a factory manufacture. This is to be distinguished from the process of using an uncured rubber and tread forming the added rubber onto the surface of a worn tire. This latter process, while operable, does not result in a new tread that has the high density and wear qualities of precured tread.

Various processes have been proposed and used in the past for applying precured treads to worn tire carcasses. In many of these prior art systems, the entire assembly of the precured tread, bonding agent and worn tire carcass is placed in an autoclave for curing. While this results in good curing of the bond material, the heat has a deleterious effect on the sidewalls of the tire carcass. Also, the apparatus required for the process is quite elaborate and bulky and poorly suited to the smaller manufacturer.

More recently, a variety of schemes have been proposed wherein mold members are utilized which do not entirely envelop the precured tread-carcass assembly but which only enclose the outer portions of the tire including the precured tread. In the majority of these systems an inflatable bag is provided within a metal mold. The bag is inflated and acts to transfer both heat and pressure to the outer surfaces of the precured tread. This type of a system also has serious drawbacks for the smaller manufacturer in terms of initial cost, operation difficulties and because of the need for frequent replacement of the inflatable bag.

In my earlier U.S. Pat. No. 3,698,975, there is disclosed and claimed a tire retreading method making use of a simplified mold which, in addition to being relatively inexpensive and of comparatively small bulk, is also free of the adverse effect of heating of the sidewall of the tire during bonding of a precured tread to the tire carcass. The present invention is an improvement over my earlier patent and the processes of other retreading systems such as described briefly above.

Broadly, the present invention constitutes an improvement over my earlier patent in its provision of a means for introducing a fluid under pressure into the cavity defined by the mold and the edges of the precured tread. The fluid which is introduced into the cavity acts to provide a uniform pressure applying media to insure the complete bonding of the precured tread to the tire carcass and simultaneously provides an additional heat transfer media for insuring that the temperature is uniform across the surface of the tire. The invention further, by increasing the rate at which heat is transferred across the precured tread, lessens the time required for the bonding process. The invention will be best understood from a study of the drawings and following specification.

IN THE DRAWINGS

In the practice of the invention a wide variety of materials can be utilized and such materials are available from numerous sources. Therefore, the examples which follow should not be taken as being limited to the specific materials identified but rather merely as showing materials which have proved to be satisfactory for the purposes of the invention. In the examples which follow, precured tire treads obtained from Harrelson Rubber Company of Asheboro, North Carolina, were utilized. The cushion gum bonding material utilized to join such precured tread to a tire carcass was a material purchased from Firestone Tire and Rubber Company of Akron, Ohio, under their designation 860-492. The times and temperatures, which will be described hereinbelow, are for these materials. Other bonding agents and different sources of tread rubber may possibly require different temperatures and/or bonding times.

While not mandatory, it has been found advantageous to use an intervening adhesive cement layer over the surface of the tire carcass prior to application of the cushion gum rubber used for bonding described above. Such an adhesive may conveniently be the spray coated adhesive cement supplied by Firestone Tire and Rubber Company under their designation 860-077.

Figure 1:
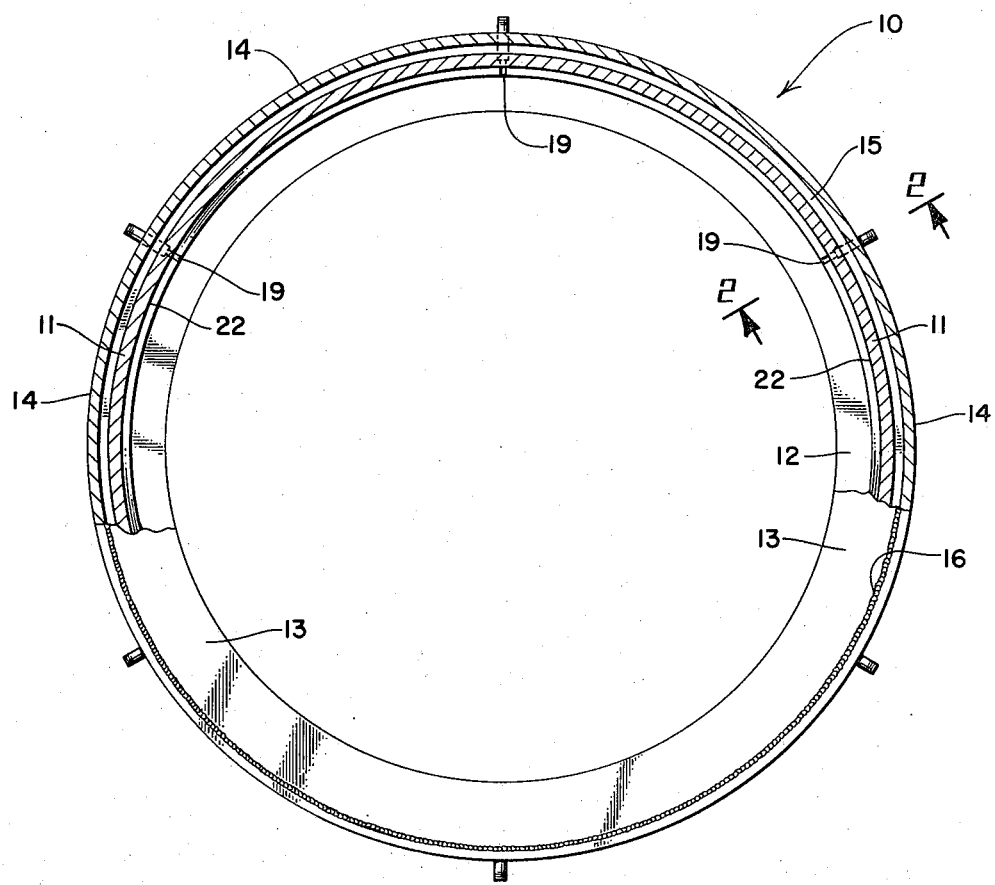
FIG. 1 is a side cross-sectional view of a mold in accordance with the invention utilizing steam as the heat source and pressure-applying media.
Figure 2:
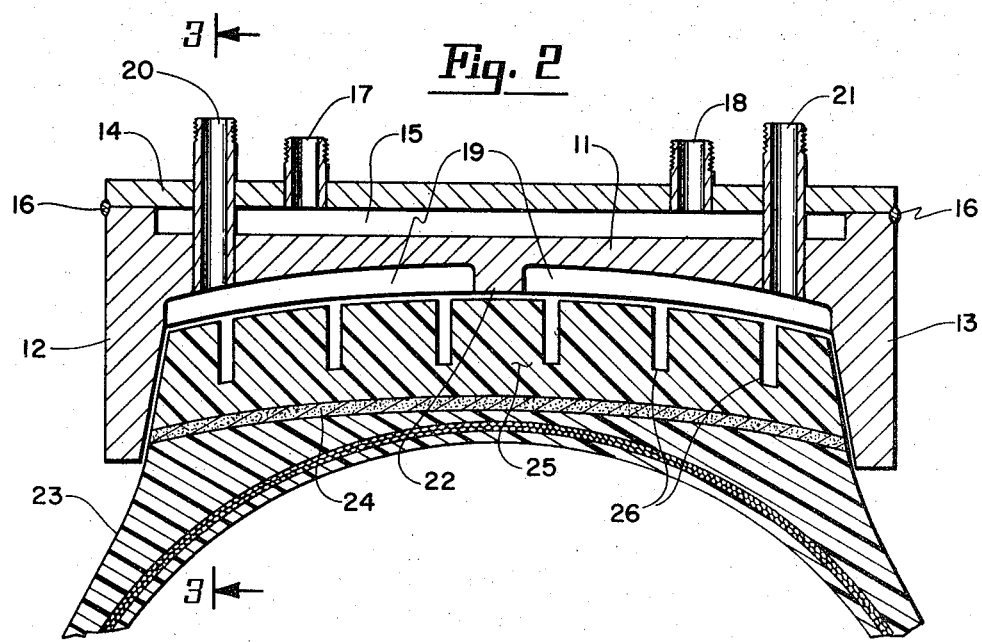
FIG. 2 is a cross-sectional view of a mold along lines 2—2 of FIG. 1 and includes a cross-section of a portion of a tire in the process of being retreaded.
Figure 3:
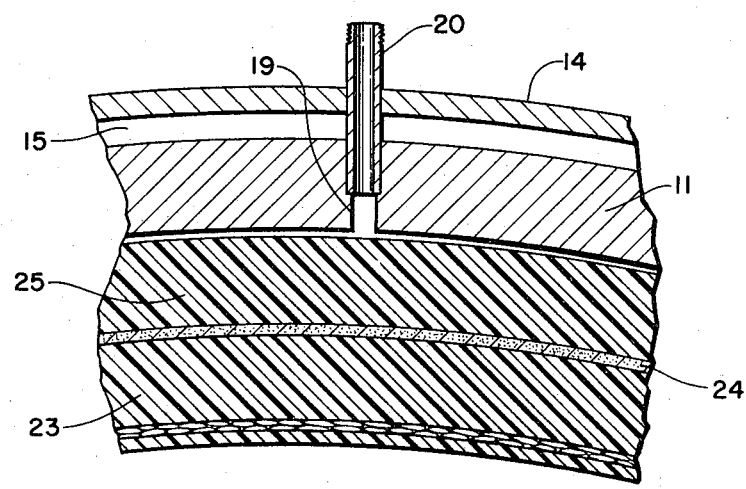
FIG. 3 is an enlarged detailed cross-sectional view of a fluid port along lines 3—3 of FIG. 2.

In FIGS. 1, 2 and 3, similar parts will be given the same numerical designation.

Referring now to FIG. 1, there is disclosed in cross-sectional view a mold generally designated 10 in side and partially cross-sectional view. The mold shown in FIG. 1 and in greater detail in FIGS. 2 and 3 is the preferred form of the invention wherein steam is utilized as the source of heat and of applying pressure to the outer surface of the precured tread.

Mold 10 is desirably formed of a metal such as aluminum for lightweight and high thermal conductivity. The interior portion of the mold consists of an annular ring 11 which has flange members 12 and 13 extending inwardly therefrom at the outer edges thereof. Flanges 12 and 13 extend inwardly a distance sufficient to pass the precured tread 25 and the bonding layer 24 but not to overlap the carcass sidewalls to any significant degree. As shown in FIG. 2, the flanges are formed integrally with member 11 although they may take the form as shown in FIG. 2 of my earlier U.S. Pat. No. 3,698,975, as illustrated in FIG. 3 thereof. That is, one of the flange members may be detachably mounted to the member 11 for simplifying introduction of a tire-precured tread assembly into the center thereof.

Mold member 11 is provided at its outer surface with a recessed region intermediate the outer edges thereof which after joining thereto of outer mold plate 14 defines a cavity 15. Plate 14 is joined to the inner mold member 11 by suitable means such as welds 16 to provide a sealed chamber 15. Steam inlet and outlet ports 17 and 18 pass through member 14 and are in fluid communication with chamber 15. As shown in FIG. 2, these ports may be conveniently provided with threaded portions or other coupling means for joining thereto steam lines.

At spaced intervals around the circumference of member 11 there is provided a plurality of slot members 19 which extend substantially across the width of the center portion of member 11 out to the edges of flanges 12 and 13. Joined to at least one of slots 19 are pressure applying ports 20 and 21 which extend through outer plate 14 and down through plate 11 until they intersect the edge of a slot 19. Tubes 20 and 21 form respectively the inlet and outlet ports for injection of fluid into the connecting slot 19. Where inlet and outlet ports 20 and 21 intersect a slot 19, it is desirable to have a discontinuity 22 in slot 19 so that inlet fluid coming in at port 20 does not find immediate exit by means of tube 21 through mere passage across the slot but rather through the transverse sections of the tread pattern.

In FIG. 1, tubes 20 and 21 are shown at each slot 19.

In the recapping process utilizing the apparatus described above, a tire carcass 23 which has been ground down to provide a bonding surface in the conventional manner has had applied to the outer perimeter thereof a bonding material 24 which may be the cushion gum bonding material described above. As desired prior to applying layer 24 to tire carcass 23, one may apply a spray adhesive cement where it is desired to insure the best possible bond. A precured tread 25 is wrapped about the outer perimeter of tire carcass 23 and bonding layer 24 and joined in the usual manner at the cut ends thereof. The entire assembly of tire carcass, bond and precured tread is then reduced in diameter by means of conventional tire spreaders and inserted into the cavity defined by mold 11 and flanges 12 and 13. The tire is then inflated to about 180 psi air pressure to force precured tread 25 firmly into the cavity and up against the interior surface of mold 11. Flange members 12 and 13 are spaced so as to engage the outer shoulders of precured tread 25 and to overlap the bonding layer 24. A substantially hermetic seal is thus formed. For the sake of clarity, the drawings show a gap existing between the outer crown of precured tread 25 and mold body 11. In actual practice, this gap would be essentially non-existent except at the region defined by slots 19.

Precured tread 25 will typically have grooves 26 which extend around the perimeter of the precured tread to form the tread pattern as well as transverse grooves. The perimeter grooves 26 are at substantially right angles to slots 19 and, of course, in fluid communication therewith.

The balance of the tire bonding process is as follows. Steam is injected under pressure and at elevated temperature into the port 17 to flood chamber 15 and exhaust out through port 18. The steam is introduced under a temperature and pressure such as to raise the temperature of the mold to approximately 300°F. The good heat conductivity of the aluminum insures that the entire mold will be at substantially the same temperature as the steam. In order to minimize waste heat loss, it is desirable to insulate the outermost surfaces of the mold assembly with a suitable material such as asbestos (not shown). Steam is also injected through port 20 into at least one of the cavities 19 where it then spreads along grooves 26 in precured tread 25 to exert pressure and act as a heat transfer media both from the mold 11 and from its own heat. The steam is injected at a pressure of about 65 psi and a temperature of about 300°F. Wherever any spaces exist between precured tread and the surface of the mold the steam penetrates and insures uniformity of pressure throughout the precured tread. As it penetrates down into the deep tread grooves 26 and along transverse sections of the same, it aids in the rate of transfer of heat across precured tread down into the bonding layer 24 and over the face of the same. It has been found that the time required for curing of a tire is cut approximately to one-half of that required in my earlier described invention of U.S. Pat. No. 3,698,975 due to the more efficient heat transfer. As flanges 12 and 13 provide an essentially hermetic seal with the edges of tread 25, no steam of any significant consequence can escape from this system.

Following the prescribed time period and temperature, the steam pressure is removed and by use of a tire spreader the now completed recapped tire is removed from the mold and the mold is available for the next cycle. It can be seen that at no time is there any heat applied to the sidewalls of the tire carcass and essentially all of the heat required for curing is transferred in a substantially vertical manner through the precured tread 25.

The time required for curing will depend not only upon the choice of materials insofar as the bonding agent is concerned but also upon the thickness of the precured tread. Generally, a time period of about one hour is sufficient for most tires utilizing the materials enumerated. As already noted, with different materials or with different thicknesses of tread, this time may vary to a greater or lesser time period. Of course, higher or lower temperatures also will vary the time required for cure.

The mold as illustrated in FIGS. 1 through 3 can take a variety of forms and still accomplish substantially identical purposes. For example, rather than having the mold formed in cross-sectional view as shown, the flat-backed mold member 11 may have wound about the outer perimeter a plurality of turns of hollow copper tubing to act as the equivalent to steam chamber 15. This tubing would, of course, be in solid physical contact with the main body of the mold so as to provide effective heat transfer therethrough. This would substitute for the steam chamber 15. Ports 20 and 21 would still be provided in fluid connection with at least one of chambers 19 to insure that the steam utilized can be passed entirely around the perimeter or surface of the tread to aid in the transfer of heat and application of pressure to the precured tread.

An alternative to the form of the invention described is to utilize simple air pressure rather than steam as a means of applying pressure through ports 20 and 21 to the tire tread. In this instance, the presence of the air under pressure provides a somewhat less effective heat transfer media although it still provides superior performance over the invention described in my earlier patent identified above.

Figure 4:
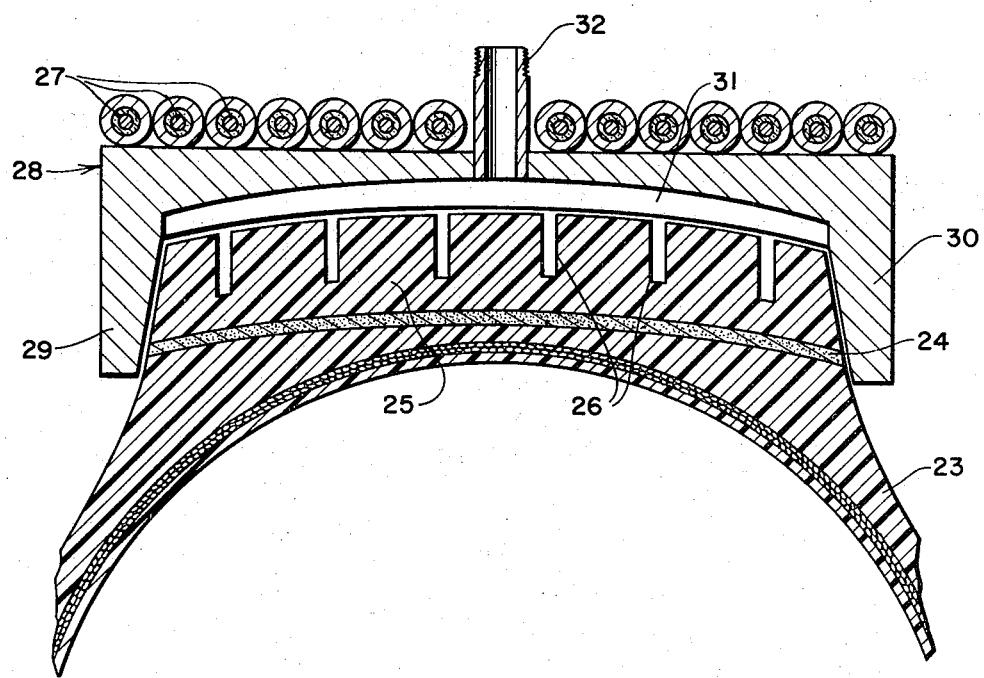
FIG. 4 is a cross-sectional view of an alternate form of the invention wherein electrical heating is utilized.

Turning now to FIG. 4, there is shown in cross-sectional view an alternate form of my invention utilizing electric heat. The view of FIG. 4 is analogous to the showing of FIG. 2 with the exception that the mold is designed specifically for use with electric heating. In the mold of FIG. 4, a plurality of coils of an insulated heating resistance wire 27 are wrapped about the outer surface of a mold 28 having inwardly extending flanges 29 and 30 by connection of a power source (not shown) across the ends of wires 27. The wires are heated by passage of electric current to the desired temperature and transmit the heat through mold 28 flanges 29 and 30 to a precured tread 25 and thus cure the bonding layer 24 to join precured tread 25 to a tire carcass 23.

In the form of the invention shown in FIG. 4, a slot 31 is provided at spaced intervals about the perimeter of a tire mold in a manner similar to that shown for slot 19 in FIG. 1 extending across the crown portion of the tread engaging surface and spaced at intervals around the mold. Slot 31 is, as in the previous instance of slot 19, desirably of relatively narrow width—1/32 of an inch is appropriate—and of relatively shallow depth—¼ of an inch has proved satisfactory extending across the face of the tread. Joined in fluid communication therewith is an inlet port 32. In the form shown in FIG. 4, air pressure is utilized as the fluid means for applying pressure to the outer surface of precured tread 25 and therefore no exit port is needed to bleed off any condensed moisture or the like. The function of the invention utilizing electric heating and ordinary air as the pressure and heat transfer fluid is essentially as was described above with regard to the precured tread insofar as time and pressures are concerned.

It is also within the scope of the invention to use a liquid transfer media through the ports as a means of transmitting pressure and conducting heat. Somewhat more efficient heat transfer can be accomplished by this means than is the case when a gaseous fluid is utilized to fill slots 19 or slot 31 as the case may be and the tread groove portions 26. A variety of fluids may be utilized although they should be of sufficient temperature capability that they do not boil under the conditions of use and thus result in less effective heat transfer than would be the case if they remained in the liquid state.

What is claimed is:

1. Apparatus for bonding a precured tread to a tire carcass without application of heat to the tire carcass sidewalls comprising a cylindrical band assembly having a substantially smooth interior surface, spaced parallel flange members in heat conducting relationship with and extending inwardly from and around said interior surface to define a precured tread aligning and engaging cavity adapted to be occupied by a precured tread, said inner surface having a plurality of spaced transverse slots positioned therein, port means in fluid communication with said slots for injection of fluid into said cavity for applying fluid pressure to the tread surface of said precured tread, and means for heating said band assembly so that heat and pressure are applied from said assembly through said precured tread to bond said tread to an underlying tire carcass.

2. An apparatus in accordance with claim 1 wherein said means for heating said assembly is a steam coil surrounding the outer portion of said assembly.

3. An apparatus in accordance with claim 1 wherein said flange members are unitary members with said inner surface.

4. An apparatus in accordance with claim 1 wherein said means for heating said assembly is an electrical resistance heating coil.

5. An apparatus in accordance with claim 1 wherein a plurality of port means are in fluid communication with said slots and are constructed and arranged to provide inlets and outlets for steam.

6. A method of retreading a tire carcass with a precured tread comprising:
   a. providing a tire carcass having a uniform peripheral surface;
   b. applying a heat curable binder composition to said surface;
   c. applying a precured tread over the surface of said binder composition entirely around the circumference of said tire carcass to form a tire assembly;
   d. placing said tire into a band having inwardly projecting flanges spaced so as to engage the lateral sides of said precured tread and to provide a substantially hermetic seal therewith;
   e. inflating said tire to expand the same against said band;
   f. introducing a fluid under pressure into the tread pattern of the precured tread; and
   g. applying heat to said band so that heat is transmitted to said binder composition solely through said precured tread rubber without application of heat to the sidewalls of said tire carcass.

7. A method in accordance with claim 6 wherein said fluid is steam at a temperature of about 300°F and said pressure is about 65 psi.

8. A method in accordance with claim 6 wherein said fluid is air and said heat is applied to the external side of said band.

* * * * *